United States Patent
Mills et al.

[19]

[11] Patent Number: 5,948,346

[45] Date of Patent: *Sep. 7, 1999

[54] DUAL PARISON STACKED CLAMP BLOW MOLDING METHOD

[75] Inventors: John W. Mills; John F. Allred, Jr., both of Wilmington, N.C.

[73] Assignee: Wilmington Machinery, Incorporated, Wilmington, N.C.

[*] Notice: This patent is subject to a terminal disclaimer.

[21] Appl. No.: 08/900,938

[22] Filed: Jul. 28, 1997

Related U.S. Application Data

[62] Division of application No. 08/611,348, Mar. 6, 1996, Pat. No. 5,681,596.

[51] Int. Cl.⁶ .......................... B29C 49/04; B29C 49/36
[52] U.S. Cl. .......................................... 264/543; 264/540
[58] Field of Search .................................. 264/540, 542, 264/543

[56] References Cited

U.S. PATENT DOCUMENTS

| | | | |
|---|---|---|---|
| 3,355,763 | 12/1967 | Willert | 264/540 |
| 3,941,863 | 3/1976 | Pollock et al. | 264/543 |
| 4,457,689 | 7/1984 | Aoki | 264/538 |
| 4,859,170 | 8/1989 | Aoki | 425/541 |

*Primary Examiner*—Catherine Timm
*Attorney, Agent, or Firm*—Rhodes & Mason PLLC

[57] ABSTRACT

A blow molding method including a clamp for clamping two molds in back-to-back relationship, the clamp having first and second movable, inner platens supporting interior sections of two molds; first and second movable outer platens supporting exterior mold sections facing the interior sections; a positioner to move the inner and outer platens between opened and closed positions; an extrusion means to extrude parisons between mold sections, injectors to inject air into the interior of the parisons; and a platen retainer to resiliently position the inner platens between the outer platens to equalize pressure in the two molds.

4 Claims, 6 Drawing Sheets

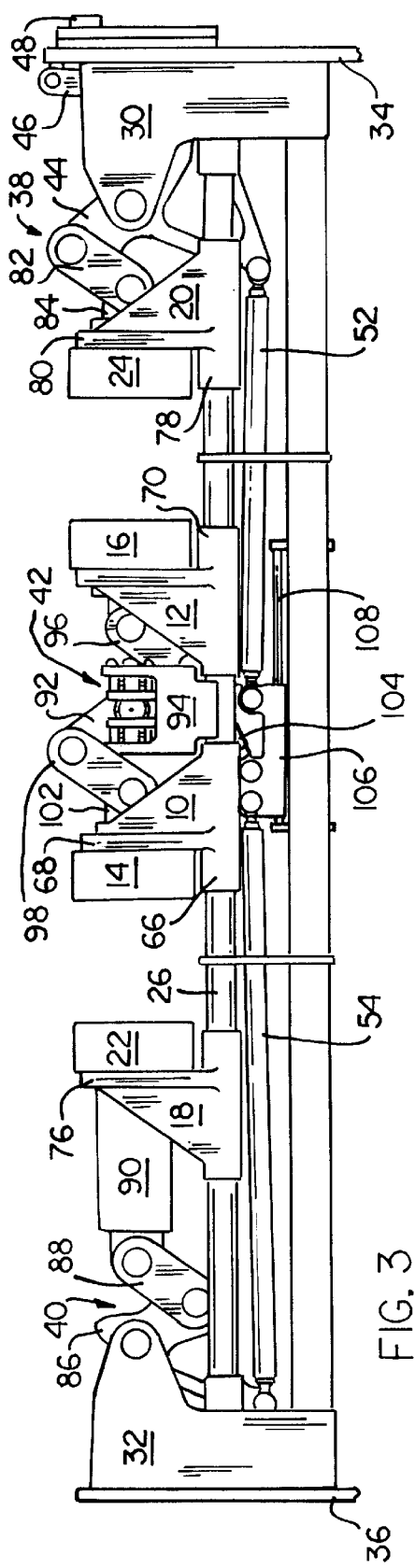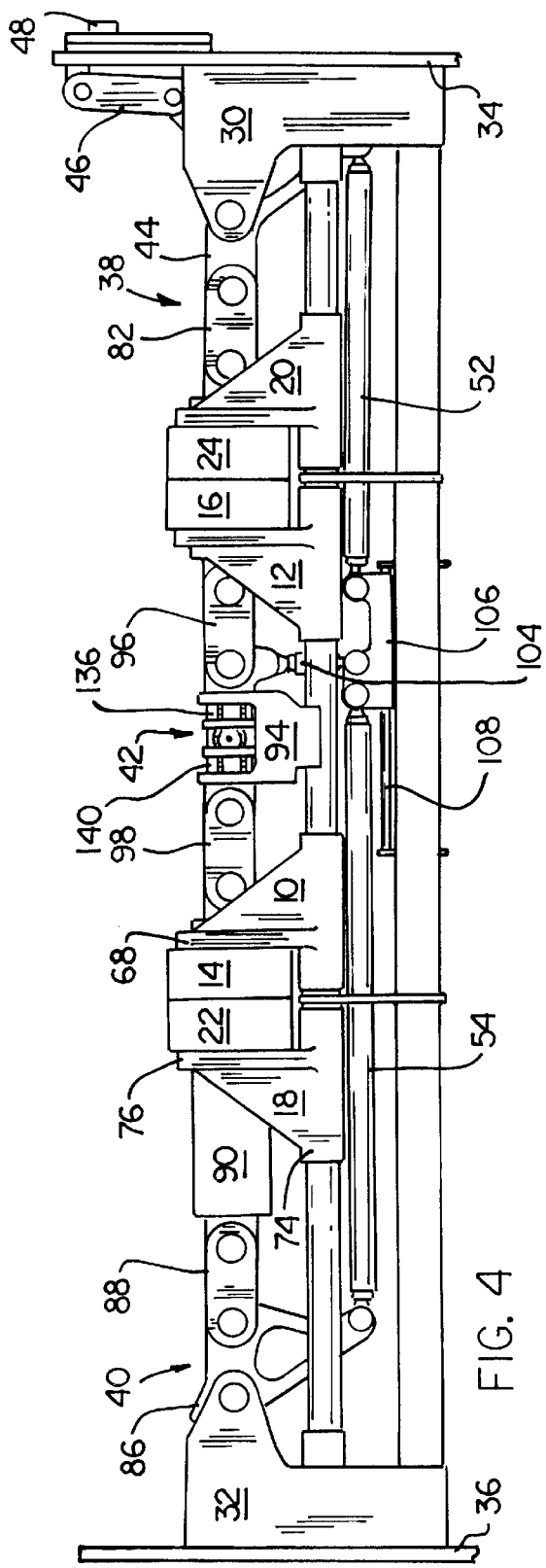
FIG. 3
FIG. 4

DUAL PARISON STACKED CLAMP BLOW MOLDING METHOD

This application is a division of application Ser. No. 08/611,348, filed Mar. 6, 1996 now U.S. Pat. No. 5,681,596.

BACKGROUND OF THE INVENTION

The present invention relates to blow molding apparatus used to mold hollow bodies from plastic material by blow molding in which two molds are clamped in a back-to-back relationship. The invention is directed especially to an extrusion blow molding apparatus in which both halves of each mold are moved during closing and opening of the molds.

In blow molding, a parison, i.e., a continuous tube of plastic material, is first extruded between two mold halves or sections, each having a back surface and a front surface, with a segment of the desired mold cavity cut into the surface of each section front surface. The opposed surfaces of the mold sections are positioned in parallel planes.

After extrusion of the parison, the mold segments are clamped together so tat the front surfaces of the mold sections are held against each other to form the complete mold cavity, and air is injected into the interior of the parison, e.g., with a blowing needle, pin or other apparatus, which penetrates the parison wall. Injection of air into the interior of the parison expands the parison to conform to the shape of the mold cavity. After cooling, the mold is opened and the hollow body ejected.

A typical blow molding apparatus is comprised of one or more clamps having opposed platens supporting mold sections. A toggle linkage, or other type of platen positioner means, is operated by some type of actuator to move the platens between open and closed positions along tie bars. The linkage also includes a locking means to lock the linkage and dies in the closed position. These basic elements, however, can be configured into different types of blow molding apparatus, depending upon the end result desired.

For example, a blow molding apparatus known as a continuous rotary blow molding apparatus is formed by positioning a plurality of outwardly facing mold clamps in a circle on a rotary support wheel, comprised of a pair of spaced, parallel, vertically positioned disks. Upon rotation, each clamp, while in an open position, passes an extruder which extrudes a parison between spaced mold sections. Thereafter, the clamp, actuated by the platen positioner, closes the mold sections around the parison. An air injector, such as a blowing needle then injects air into the interior of the parison inside the mold cavity to expand the parison into a hollow body conforming to the interior shape of the mold cavity. The clamp then continues its rotation to cool the hollow body. After the hollow body is cooled, the mold clamp is opened and the hollow body ejected. Each clamp supported on the rotary wheel continues in sequence through these molding stages.

In another kind of blow molding apparatus, known as a shuttle molding apparatus, mold sections are supported in an open position in a single clamp which is moved back and forth between a molding station and a discharge station. The clamp is first moved to an extrusion or molding station where a parison of polymeric material is extruded between the mold segments. The mold segments are then clamped about the parison, air is injected into the parison to form the hollow body, and the clamp is then moved to a discharge station where the clamp is opened and the hollow body discharged. The clamp is then returned with the mold sections in an open position back to the extrusion station.

In the foregoing types of blow molding apparatus, as well as other types of extrusion blow molding apparatus known in the prior art, heavy clamping structures and high clamping pressures are required in order to squeeze and pinch the parisons during clamping, and withstand the internal pressures generated within the mold cavity during injection of air to form the hollow bodies. These pressures may be, for example, on the order of from about 40 to about 125 pounds per square inch. As a result of the high pressures required, the total surface area of the mold cavity, and thus the number or size of the items which can be formed during one molding cycle, is limited.

To increase capacity, it has been necessary to either utilize larger, multiple cavity, side-by-side molds, which have required heavier platens, heavier platen actuator means and greater forces, with consequently greater energy requirements, to move the heavier clamping mechanisms, or to utilize more molding apparatuses, which has required a duplication of all parts and increased energy due to the necessity of clamping and moving more molds.

Various types of blow molding apparatuses, and blow molding sections of injection blow molding apparatus, are described in the prior art. One of the earlier devices, described in U.S. Pat. No. 3,364,520 to Hestehave, is a rotary blow molding apparatus with a plurality of molds, each clamped between movable platens, which are opened and closed by toggle mechanisms in turn operable by hydraulic cylinders.

U.S. Pat. No. 3,936,521 to Pollock et al describes a rotary blow molding apparatus having a plurality of mold clamps spaced around a rotary table. In each clamp, a movable platen holding one mold segment is moved between open and closed positions relative to a second platen holding an opposed mold segment by a linkage assembly operated by a hydraulic cylinder.

In other devices, such as the rotary blow molding apparatus described in U.S. Pat. No. 3,985,485 to Farrell, and the blow molding section of the injection blow molding apparatus described in U.S. Pat. No. 4,818,213 to Roy, the movable platens are operated directly by hydraulic cylinders.

U.S. Pat. No. 4,457,689 to Aoki, U.S. Pat. No. 4,747,769 to Nakamura et al, and U.S. Pat. No. 4,859,170 to Aoki describe rotary injection stretching blow molding apparatus in which each mold station includes two radially spaced molds. The opposed segments of each mold are supported on movable platens which are moved together with hydraulic cylinders to close the mold.

In the above prior art apparatus, an increase in capacity either requires the use of greater pressures, resulting in the need for heavier equipment and greater use of energy, or a greater number of clamping stations. U.S. patent application Ser. No. 08/252,685 to John F. Alred, Jr., filed Jun. 6, 1994, now U.S. Pat. No. 5,551,862 Sep. 3, 1996, and assigned to Wilmington Machinery Incorporated, the assignee of the present invention, the application being incorporated herein by reference in its entirety, describes a blow molding apparatus that permits molding of a greater surface area without increased pressures and energy expenditure, or the use of a greater number of clamping stations.

The Allred apparatus achieves these objectives with a clamp that stacks two molds in back-to-back relationship. The clamp includes two spaced, movable outer platens supporting inwardly facing mold halves, and a central, substantially fixed central platen supporting outwardly facing mold halves on each side. An extruder of conventional design extrudes a first parison between mold halves supported by the central platen and the first movable platen, and a second parison between mold halves supported by the central platen and the second movable platen.

After the parisons are extruded between the spaced mold halves, a platen positioner moves the first and second movable platens toward the central platen to close the molds. The platen positioner may comprise a linkage including a toggle mechanism to hold the dies in a closed, locked position during the molding stage. Alternatively, the platen positioner may comprise extendable rods, or other adjustment means, controlled by electrical, hydraulic, pneumatic, or mechanical devices, of the kinds previously disclosed in the art.

In order to ensure that both molds are subjected to equal pressure, the central platen in the Alfred apparatus is resiliently positioned by a platen retainer that allows the central platen to adjust to a limited extent toward either the first or second movable platen in response to unequal pressures or movement against the opposed mold supporting surfaces of the central platen. After the molds are closed and locked, air is blown into the interior of the parisons in the molds to expand the molds to the shape of the cavity. Thereafter, the platen positioner reverses direction to open the molds and discharge the blow molded products.

The Alfred apparatus overcomes some important limitations of prior art devices and is suitable for many molding operations. However, the structure of the apparatus limits the speed at which the molds can be opened and closed, resulting is a corresponding limitation on the number of items tat can be molded during a given time period. The cycle time, i.e., the time required to complete one molding cycle, determines the number of articles that can be produced with one blow molder in a given time. Reduced cycle times result in greater efficiency and lower cost. Thus, a blow molding apparatus having the advantages of the Alfred apparatus in which the cycle time could be reduced by opening and closing the molds with greater speed, would be of considerable commercial value.

Thus, it is a primary aspect of the present invention to provide an apparatus of the type described by Alfred that will permit faster mold opening and closing. Specifically, it is an aspect of the invention to provide a dual parison blow molding clamp supporting two molds in back-to-back relationship, including means for rapidly opening and closing the facing halves of each mold. It is another aspect of the invention to provide a dual parison blow molding apparatus including a plurality of molds of this construction. Other aspects of the invention will be apparent to one skilled in the art from a reading of the description of the invention which follows.

SUMMARY OF THE INVENTION

In the following description, terms such as horizontal, upright, vertical, above, below, beneath, and the like, are used solely for the purpose of clarity in illustrating the invention, and should not be taken as words of limitation.

The present invention is an extrusion blow molding apparatus comprised of a plurality of mold clamps, a clamp support, an extruder for extruding a parison between each pair of mold halves, and a platen positioner actuator. Each clamp is comprised of first and second movable, inner platens having outwardly facing, mold section supporting surfaces; first and second movable outer platen having mold section supporting surface facing the mold section supporting surfaces of said first and second inner platens; a platen positioner for moving said inner platens outwardly while moving said outer platens inwardly; and a platen retainer for resiliently positioning said first and second movable inner platens. The mold supporting surfaces of the inner and outer platens will normally lie in parallel planes.

Preferably, the platen positioner comprises connected segments, including a first segment for moving the outer platens and a second segment for moving the inner platens, whereby movement of the first segment moves the second segment. For example, the platen positioner can have a first toggle linkage pivotally connected to the first outer platen, a second toggle linkage pivotally connected to the second outer platen, and a third toggle linkage pivotally connected to the first and second inner platens. The three toggle linkages can then be connected to each other, so that movement of one toggle linkage moves the other two toggle linkages.

Thus, the invention contemplates a clamp for clamping two mold sections in back-to-back alignment in a blow mold comprising a support frame including first and second spaced bolsters, and a platen support extending between the bolsters; first and second movable, inner platens positioned on the platen support; a first movable outer platen positioned on the platen support between the first bolster and the first inner platen; a second movable outer platen positioned on the platen support between the second bolster and the second inner platen; and a platen positioner connected to the inner and outer platens to move the outer platens inwardly while moving the inner platens outwardly. The inner platens can be resiliently supported on a platen retainer, whereby unequal pressure against the inner platens will cause the inner platens to move in the direction of lowest pressure, thereby equalizing mold pressures.

The platen positioner may include a first segment extending from the first bolster to the first outer platen, a second segment extending from the second bolster to the second outer platen, and a third segment extending between the first and second inner platens, the segments being operatively connected, e.g., by draw bars. One segment may be attached to an actuator, so that movement of the one segment moves the other two segments. The segment of the platen positioner used to move the inner platens is desirably positioned on a platen retainer supported between the inner platens.

The lengths and connections of the toggle segments are adjusted so that the inner platens reach their extended and locked positions before the mold halves carried thereon engage the mold halves carried on the outer platens. The inner and outer mold halves are then brought into engagement and the toggle segments attached to the outer segments are brought to their locked positions. Extension of the inner platens to their extended and locked positions is thus ensured. If the inner platens are not locked before engagement of the mold halves, the pressure exerted against the inner molds may prevent locking of the inner platens.

A plurality of the above clamps form a part of a blow molding apparatus that also includes an extrusion means adapted to extrude a first parison between the first inner platen and the first outer platen and a second parison between the second inner platen and the other outer platen; and an injector to inject a gas into the interior of the first and second parisons.

As noted above, the clamp includes a platen retainer resiliently positioning the inner platens between the outer platens to equalize mold pressures, preventing blow out and breakage. As described in the preferred embodiment, one of the toggle segments attached to an outer platen includes a spring pack to exert pressure when the platens are in the closed and locked position. In order to activate the spring pack, the toggle will momentarily extend the attached platen past its locked position, creating a higher pressure on the mold adjacent this platen. The platen retainer also serves to move the platen pairs in a direction away from the spring pack during this actuation.

The platen retainer may, for example, include a first spring extending outwardly toward a first outer platen and a second spring extending outwardly toward the other outer platen. When unequal pressures are applied to the molds, the spring on the side with the lower pressure yields, allowing the platen retainer, the platen positioner carried thereon, and the inner platen to move in the direction of lowest pressure until the mold pressures are equalized.

When the invention is in the form of a rotary blow molding apparatus for simultaneously blow molding hollow bodies in two molds held in fixed, back-to-back configuration, the apparatus comprises a rotatable wheel or table; a plurality of mold clamps radially positioned on table, with each clamp having a first and second movable, outwardly facing mold supporting surfaces, first and second movable, inwardly facing mold support surfaces, a platen positioner adapted to move the inner mold supporting surfaces between an open inner position and a closed outer position, while moving the outer mold supporting surfaces between an open outer position and a closed inner position, and a platen retainer adapted to permit limited movement of said outwardly facing surfaces; an extrusion means adapted to sequentially extrude a first parison between the first outwardly facing surface and the first inwardly facing surface, and a second parison between the second outwardly facing surface and the second inwardly facing surface of each of said clamps; a platen positioner to move said outwardly and inwardly facing surfaces into engagement over said parisons; and injectors adapted to inject a gas into the interior of the first and second parisons when the mold segment surfaces are in engagement.

In operation, there is provided, first and second molds, with each of the molds having an interior section with a cavity containing facing surface, and an exterior section with a cavity containing facing surface. The interior sections of the molds are positioned in a back-to-back relationship with their facing surfaces in opposite directions, and the exterior sections of the molds are positioned with their facing surfaces toward and spaced from the facing surfaces of the interior sections.

Parisons are extruded between the mold sections of each mold, and the interior sections are moved toward the exterior sections, while simultaneously moving the exterior sections toward the interior sections until the interior and exterior sections are in engagement and against the parisons. The mold sections are then clamped together, and a gas is blown into the interior of the parison segments within the mold cavities to expand the parisons to the shape of the mold cavities. The resultant structures are cooled and the mold sections are opened. When unequal pressures result in the molds during closing of the mold segments, the inner mold segments are moved in the direction of the mold upon which the lower pressure is exerted, equalizing the pressure on the molds.

In the drawings and description of the preferred embodiment which follows, the foregoing elements are described in the context of a rotary blow molding apparatus. It should be understood, however, that these elements can also form a part of other types of blow molding apparatus, and that the present invention is applicable to blow molding apparatus in general.

BRIEF DESCRIPTION OF THE DRAWINGS

FIG. 3 is a side view of the blow mold clamp in a open position with molds supported thereon.

FIG. 4 is a side view of the blow mold clamp in a closed position with molds supported thereon.

DESCRIPTION OF THE PREFERRED EMBODIMENT

Figure 1:
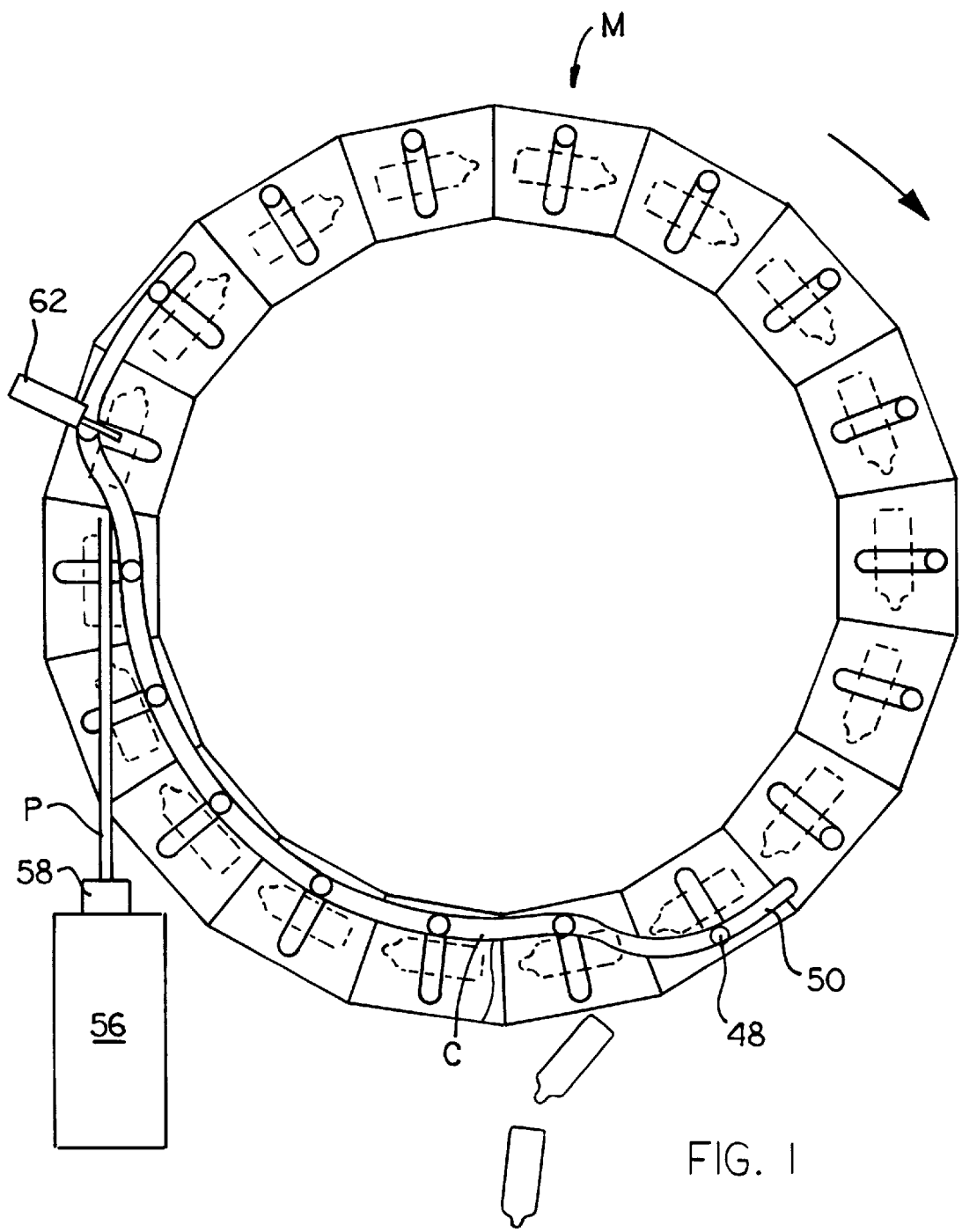
FIG. 1 is a diagrammatic or schematic side view of a rotary blow molding apparatus constructed in accordance with the present invention.
Figure 2:
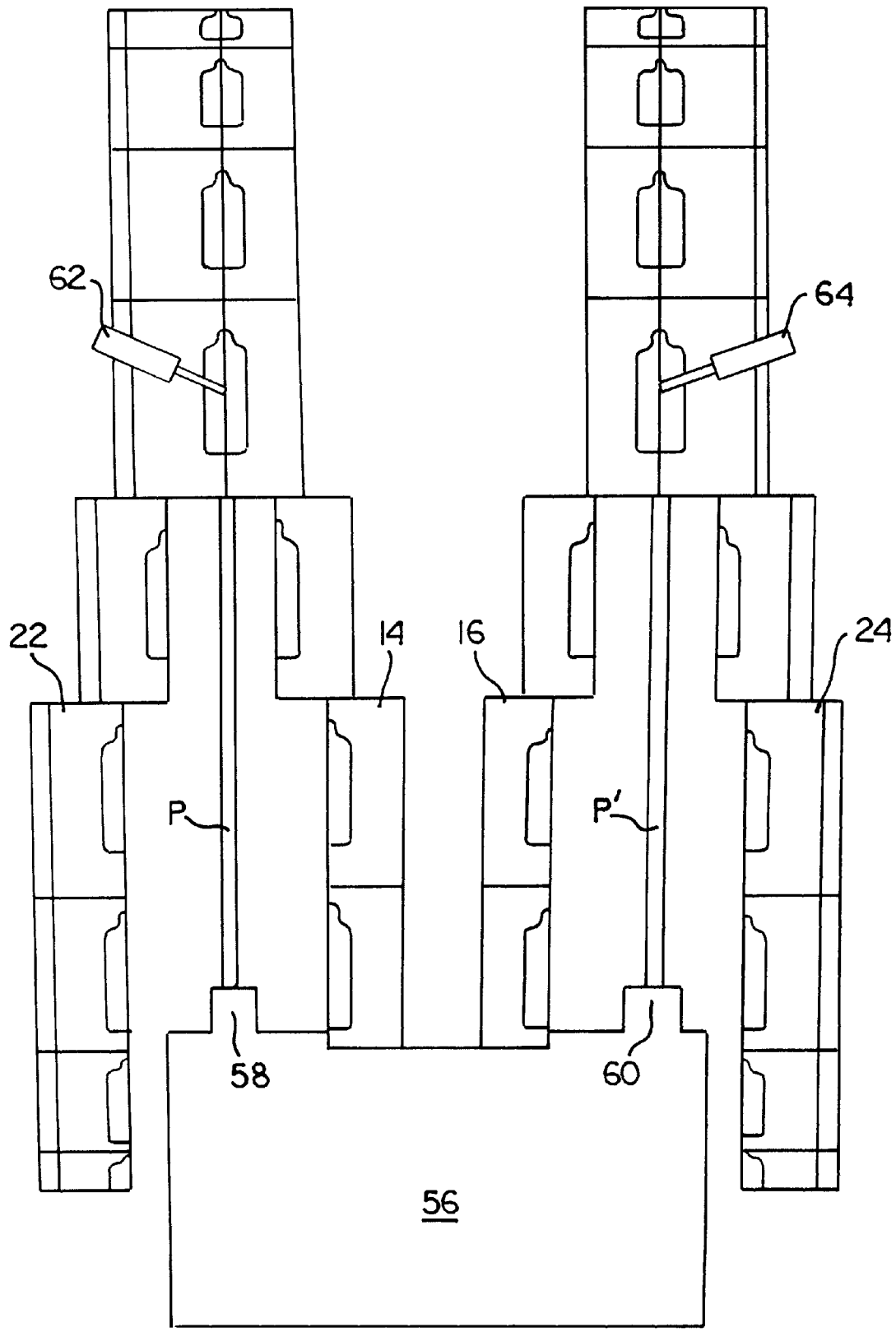
FIG. 2 is a schematic view of periphery of the rotary blow molding apparatus shown in FIG. 1.

FIGS. 1 and 2 diagrammatically illustrate a rotary blow molding apparatus M showing placement of the back-to-back molds with the inner and outer platens. It will be noted that the apparatus illustrated includes eighteen mold sets each containing two molds in back-to-back relation, or a total of thirty-six molds mounted on a Ferris wheel-like arrangement. Each mold is comprised of an exterior die half or section supported by a movable outer platen and an interior die half or section supported by a movable inner platen.

Each clamp supports two molds, each mold being comprised of an exterior section and an interior section. Since each clamp supported on the wheel is identical to the other clamps on the wheel, the ensuing description will describe one clamp, it being understood that the description is applicable to all of the other clamps. While the rotary apparatus, extruder head and blowing needle are conventional, the heart of the present invention lies in the unique clamp that carries back-to-back molds operated by a common positioner. Details of the dual clamp will be better understood by reference to FIGS. 3–7, it being understood that all other mold sets will be supported by identical clamps.

In FIG. 1, there is illustrated schematically a relatively conventional cam track or frame C. As the supporting Ferris wheel-like unit rotates, a cam follower associated with each clamp engages the cam track and is caused to move radially inwardly. The movement of the cam follower causes a resulting actuation of the operating linkage of the corresponding clamp to unlock, open and discharge a molded article. After passing the discharge position and the parison extruder, the cam follower is moved in the opposite direction to close and lock the operating linkage. It should be recognized that use of the camming arrangement is representative only, and other clamp or linkage actuating systems such as electrical, hydraulic and pneumatic actuators are also envisioned.

Each clamp includes first and second inner platens 10 and 12, which support first and second inner mold sections 14 and 16, respectively; and first and second outer platens 18 and 20 supporting first and second outer mold sections 22 and 24, respectively. Molds sections 14 and 22 form a first mold and sections 16 and 24 form a second mold. Inner platens 10 and 12, and outer platens 18 and 20, are slidably supported on tie bars 26 and 28 which, in turn, are attached at their opposed ends to bolsters 30 and 32, that are mounted on a pair of parallel, rotatable support disks 34 and 36 forming part of the Ferris wheel-like rotating unit.

The platens are actuated by a platen positioner comprised of three toggle linkages connected to act together. A first toggle linkage 38 connects bolster 30 to outer platen 20, a second toggle linkage 40 connects bolster 32 to outer platen 18, and a third toggle linkage 42 connects inner platens 10 and 12. The toggle linkages 38 and 40 which will be described later in greater detail, serve to move platens 18 and 20 between open and closed positions, while toggle linkage 42, which will also be described in detail, serves to move inner platens 10 and 12 between open and closed positions.

Toggle linkage 38 includes a generally triangular pivot arm 44 pivotally connected at a central point to bolster 30. One apex of arm 44 is pivotally connected by a linking arm 46 to a cam follower 48, that extends through a slot in the adjacent disk 34 of the apparatus frame. Upon rotation of the apparatus by a motor, not shown, cam follower 48 engages cam track 50, which extends generally horizontally alongside disk 34. Further rotation of disk 34 causes follower 48 to ride along cam track 50 and move radially inwardly, causing linkage 38 to move the platens to the open position.

As will be detailed later, toggle linkages 40 and 42 are connected to toggle linkage 38 by draw bars 52 and 54, simultaneously causing toggle linkage 40 to move platens 18 to the open position, and toggle linkage 42 to move platens 10 and 12 inwardly to the open position. Further rotation of disk 34 causes follower 48 to move radially outward, reversing the direction of toggle linkages 38, 40 and 42, thus moving platens 10, 12, 18 and 20 to their closed position.

The blow mold apparatus also includes a dual head extruder 56 with heads 58 and 60 to extrude parisons P and P', respectively, between the exterior and interior sections of the first and second molds. Air is injected into the interior of the parisons P and P' with blow needles 62 and 64, respectively.

Each platen is comprised of a horizontal sleeve or bushings to receive tie bars 26 and 28, and a vertical support plate for supporting a mold section. The back surface of the mold section is attached to the face of the support plate. The actual attachment means has not been illustrated, since various attachment means, e.g., bolts, are known in the prior art. Specifically, platen 10 comprises bushing 66 and plate 68; platen 12 comprises bushing 70 and plate 72; platen 18 comprises bushing 74 and plate 76; and platen 20 comprises bushing 78 and plate 80.

Pivot arm 44 is also pivotally attached to the outer end of draw bar 52, and to one end of a linking arm 82 that is pivotally attached at its other end by pivot pin to a mounting bracket 84 secured to first outer platen 20.

Toggle linkage 40 includes a generally triangular pivot arm 86 pivotally attached at one apex to bolster 32, at another apex to the outer end of draw bar 54, and at another apex to one end of a linking arm 88. The other end of linking arm 88 is pivotally attached to disk spring 90, which is attached to second outer platen 18.

Disk spring 90, comprised of a plurality of parallel, compressible plates or disks, is pre-set to the desired clamping force. When the clamp is in the open position, the spring plates are compressed in a locked condition. When the clamp is locked, however, spring 90 is compressed by toggle linkage 40, which is rotated past horizontal, to unlock the plates. When unlocked, pressure on the clamps is exerted by disk spring 90, instead of by the toggle linkage, thus minimizing wear on the toggle linkage, while ensuring that the desired degree of force will be exerted. When the clamp is unlocked, the toggle is again rotated past horizontal to relock disk spring 90.

Toggle linkage 42, used to move inner platens 10 and 12, is comprised of a central pivot arm 92, pivotally ached at a central point to a platen retainer, generally 94, and a pair of linking arms 96 and 98 pivotally attached to opposite ends of arm 92. The opposite ends of arms 96 and 98 are pivotally attached to mounting brackets 100 and 102, respectively.

Pivot arm 92 is also pivotally attached at one end to a short draw bar 104, that is pivotally connected at its opposite end to a draw bar connector 106. The inner ends of draw bars 52 and 54 are also pivotally attached to connector 106, permitting simultaneous movement of all toggle linkages. Connector 106 is slidably supported on connector support bar 108, which is mounted on a third tie bar 110, joining bolsters 30 and 32.

Toggle linkages 38, 40 and 42 and are adjusted so that linkage 42 carrying inner platens 10 and 12 reaches its extended and locked position immediately before mold halves 14 and 16 engage mold halves 22 and 24, respectively. This locking may occur when the respective mold halves are almost touching, e.g., within less than an inch of each other. Mold halve pairs 14/22 and 16/24 are then brought into engagement and toggle segments 38 and 40 are pivoted to their locked positions. Locking of segment 42 is thus assured; otherwise, locking may be prevented by the pressure exerted against the inner mold halves.

During clamping, the pressures exerted on the two molds may differ as a result of the action of disk spring 90, as well as factors such as machining tolerances, parts wear, and machine adjustments. The differences in pressure may cause leakage from one of the molds during blowing, and can even cause one of the platens or the toggle mechanism to break. Therefore, it is an important aspect of the present invention to provide a way to resiliently retain inner platens 10 and 12 so that they are permitted to move a small distance in either direction between outer platens 18 and 20 in order to equalize pressure in the molds 10. A movement of the platen in either direction of up to about 0.020 inch is generally sufficient.

This result is achieved by mounting toggle linkage 42 on platen retainer 94. Retainer 94 is fixedly mounted on tie bars 26 and 28, while the central pivot arm 92 of toggle linkage 42 is supported on a resilient mounting. As a result, when the pressures between mold pairs 14/22 and 16/24 are different, toggle linkage 42 and connected platens 10 and 12 are permitted to move in the direction of the mold pair being subjected to the lowest pressure until the pressures are equalized.

Figure 5:
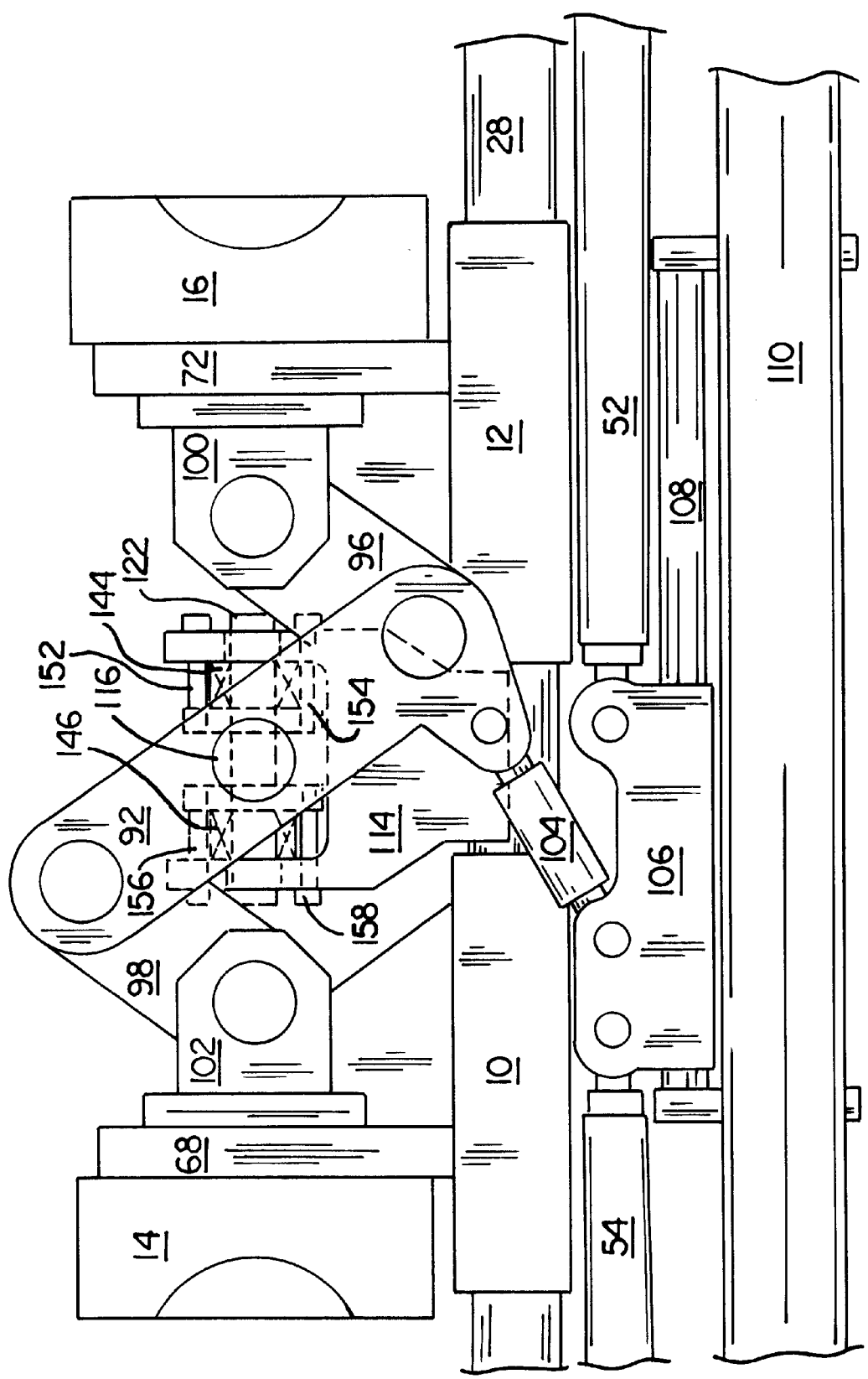
FIG. 5 is a detailed, sectional side view of the inner platen toggle mechanism in open position, with a portion of the platen retainer shown by dotted lines.
Figure 6:
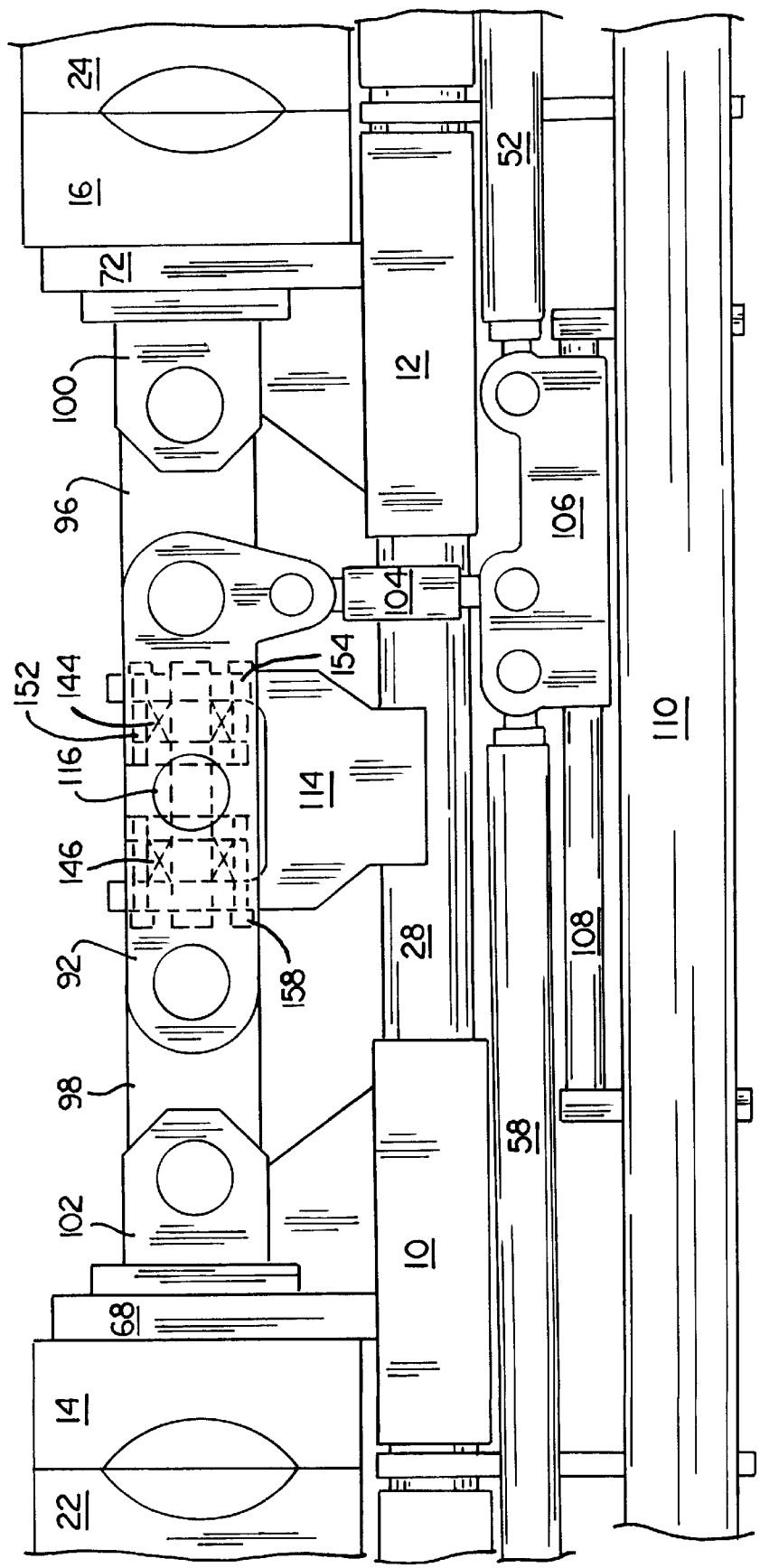
FIG. 6 is a detailed, sectional side view of the inner platen toggle mechanism in closed position, with a portion of the platen retainer shown by dotted lines.
Figure 7:
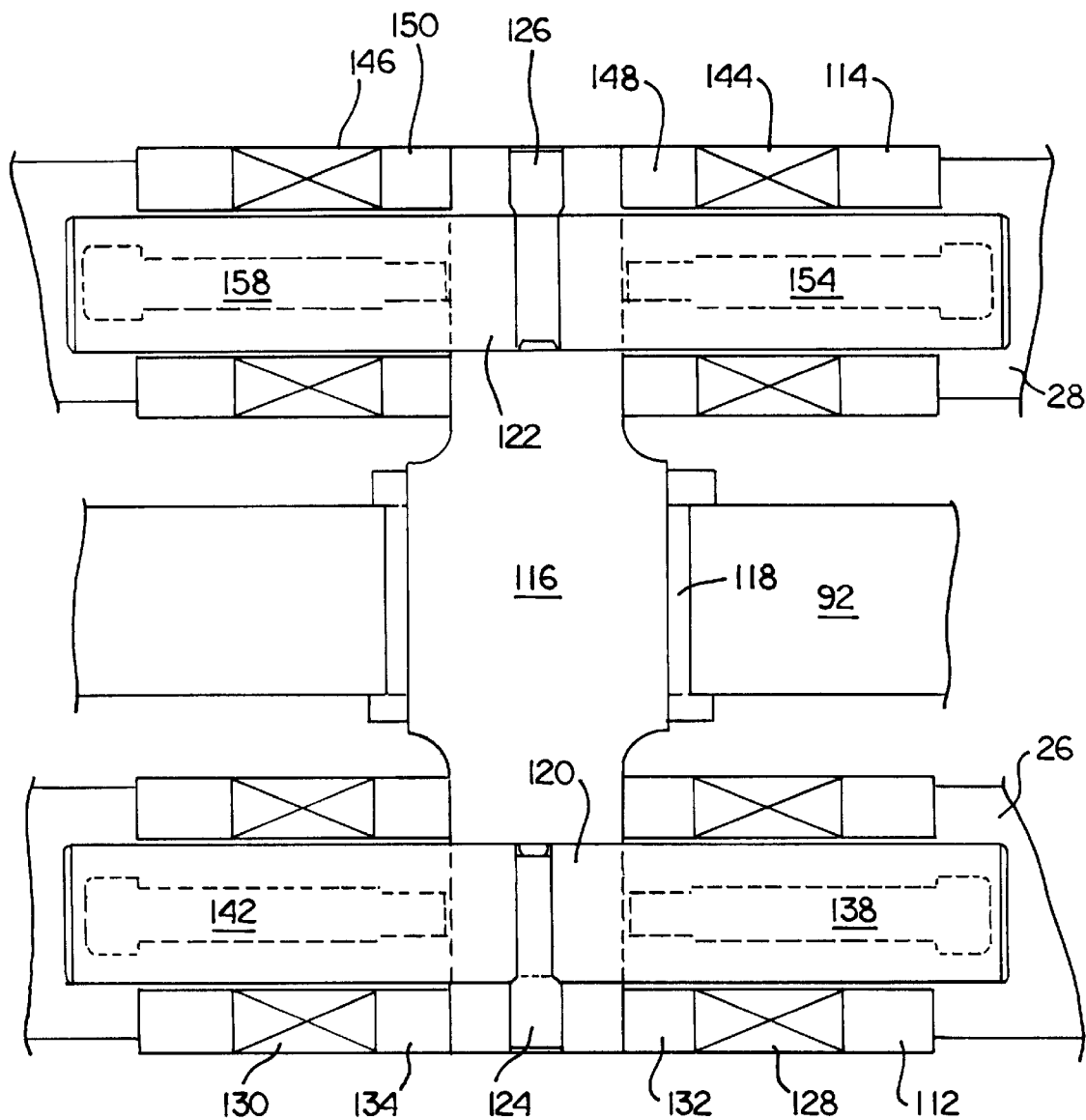
FIG. 7 is a detailed, sectional top view of the inner platen retainer.

FIGS. 5–7 provide a detailed view of platen retainer 94, which is comprised of a pair of support yolks 112 and 114 having spaced upright arms. Yolks 112 and 114 are fixedly attached to tie bars 26 and 28, respectively, by bolts or other conventional means. Pivot arm 92 of toggle linkage 42 is supported between yolks 112 and 114 on the central cylindrical section of an axle 116, which has ends with cut away vertical faces. A bushing 118 around axle 116 facilitates rotation of arm 92. Horizontal, parallel support rods 120 and 122 extend perpendicularly through the ends of axle 116 with their ends slidable mounted in openings in the upright arms of yolks 112 and 114, respectively. Rods 120 and 122 are secured in axle 116 by retainer pins 124 and 126, respectively.

In order to resiliently position axle 116, and thus platens 10 and 12, opposed springs 128 and 130 are positioned around rod 120 and between the vertical faces of axle 116 and the upright arms of yolk 112. Mounting plates 132 and 134 are positioned between the vertical faces of axle 116 and springs 128 and 130, respectively. Spring 128 is partially compressed between one arm of yolk 112 and plate 132 by bolts 136 and 138, which extend slidably through openings in yolk 112, with their ends screwed into plate 132. Bolts 140 and 142 hold spring 130 in the same manner.

Similarly, opposed springs 144 and 146 are positioned around rod 122 and between the vertical faces of axle 116 and the upright arms of yolk 114. Mounting plates 148 and 150 are positioned between the vertical faces of axle 116 and springs 144 and 146, respectively. Spring 144 is partially compressed between one arm of yolk 114 and plate 148 by bolts 152 and 154, which extend slidably through openings in yolk 114, with their ends screwed into plate 148. Spring 146 is partially compressed between one arm of yolk 114 and plate 150 by bolts 156 and 158, which extend slidably through openings in yolk 114, with their ends screwed into plate 150.

In operation, interior mold halves 14 and 16 of a pair of molds are attached with outwardly projecting faces to inner platens 10 and 12, respectively. Exterior mold halves 22 and 24 are attached with inwardly projecting faces to outer platens 18 and 20, respectively. Parisons P and P' are extruded from heads 58 and 60 of dual head extruder 56 between the exterior and interior mold sections of each mold.

The molds are then closed by actuating the toggle assembly to simultaneously move platens 10 and 12 outwardly and platens 18 and 20 inwardly. Linkage 42 first reaches its extended and locked position. Immediately thereafter exterior mold half 22 abuts against interior mold half 14, and exterior mold half 24 abuts against interior mold half 16, and a predetermined pressure is exerted against each mold by the action of spring pack 90. Complete rotation of the toggle assembly locks linkages 38 and 40, and holds the molds 14/22 and 16/24 in a securely locked configuration.

If the pressure exerted between one pair of mold halves is greater than the pressure between the other pair of mold halves at any time during locking, the difference in pressures will be communicated through platens 10 and 12, and toggle linkage 42, so that axle 116 will exert a greater pressure against one side or the other of platen retainer 94, compressing the springs on that side, and shifting the position of axle 116 to equalize the pressure between the molds.

After the molds are closed and locked, air is injected through blow needles 62 and 64 into the interior of parisons P and P', respectively, to expand the parisons to conform to the shape of the mold cavities. The hollow bodies thus formed are then cooled to maintain their shape, the molds are opened by retracting first and second inner platens 10 and 12, and first and second outer platens 18 and 20 to their open positions, and the blow molded bodies are ejected.

Certain modifications and improvements will occur to those skilled in the art upon a reading of the foregoing description. By way of example, hydraulic cylinders can be used to open and close the platens. Also, different types of resilient retainers can be used to support the central platen. The apparatus, while illustrated with molds of the same size, can also be used to clamp two molds of different sizes in a fixed, back-to-back relationship. It should be understood that all such modifications and improvements have been deleted herein for the sake of conciseness and readability but are properly within the scope of the following claims.

What is claimed is:

1. A method for blow molding first and second hollow bodies in two molds, each mold having a movable inner mold section and an outer mold section, with said inner mold sections being in back-to-back alignment in a blow molding apparatus comprising:

(a) providing first and second, outwardly facing movable inner mold sections supported on an adjustable central platen;

(b) providing first and second inwardly facing outer mold sections, said first outer mold section facing the first inner mold section, and said second outer mold section facing the second inner mold section;

(c) continuously extruding first and second parisons along parallel pathways;

(d) simultaneously moving said first and second movable inner mold sections outwardly to a first extended and locked position, while moving said outer mold sections outwardly inwardly to a second extended and locked position, said inner mold sections being moved to said first extended and locked position before said outer mold sections are moved to said second extended and locked position, with said first parison being between said first inner mold section and said first outer mold section and said second parison being between said second inner mold section and said second outer mold section;

(e) positioning said central platen relative to said outer mold sections to equalize clamping pressure in said molds when said mold sections are moved to said closed position; and (f) simultaneously injecting gas into the interiors of said first parison between said first inner and outer mold sections, and into said second parison between said second inner and outer mold sections while said mold sections are in said closed position thereby blow molding said parisons.

2. The method of claim 1, including resiliently positioning said central platen, whereby said central platen adjusts in response to unequal pressure when said mold sections are moved to said closed positions.

3. A method for blow molding first and second hollow bodies in two molds, each mold having a movable inner mold section and an outer mold section, with said inner mold sections being in back-to-back alignment in a blow molding apparatus comprising:

(a) providing a plurality of mold clamps, each clamp having first and second, outwardly facing movable inner mold sections supported on an adjustable central platen, and first and second inwardly facing outer mold sections, said first outer mold section facing the first inner mold section, and said second outer mold section facing the second inner mold section;

(b) continually extruding a first parison between said first inner mold section and said first outer mold section, and a second parison between said second inner mold section and said second outer mold section, on each of said clamps as said clamps sequentially pass said parisons;

(c) sequentially moving said clamps past said parisons to position said first parison between said first inner and outer mold sections, and said second parison between said second inner and outer mold sections as each of said clamps sequentially passes said parisons;

(d) simultaneously moving said first and second movable inner mold sections outwardly to a first extended and locked position, while moving said outer mold sections inwardly to a second extended and locked position, said inner mold sections being moved to said first extended and locked position before said outer mold sections are moved to said second extended and locked position, with said first parison being between said first inner mold section and said first outer mold section and said second parison being between said second inner mold section and said second outer mold section;

(e) simultaneously injecting gas into the interiors of said first parison between said first inner and outer mold sections, and into said second parison between said second inner and outer mold sections while said mold sections are in said closed position thereby blow molding said parisons.

4. The method of claim 3, including resiliently positioning said central platen, whereby said central platen adjusts in response to unequal pressure when said mold sections are moved to said closed positions.

* * * * *